US009230194B2

(12) United States Patent
Rabinovich et al.

(10) Patent No.: US 9,230,194 B2
(45) Date of Patent: Jan. 5, 2016

(54) TRAINING IMAGE SAMPLING

(71) Applicant: Google Inc., Mountain View, CA (US)

(72) Inventors: Andrew Rabinovich, San Diego, CA (US); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 14/027,512

(22) Filed: Sep. 16, 2013

(65) Prior Publication Data

US 2015/0170001 A1 Jun. 18, 2015

(51) Int. Cl.
*G06K 9/00* (2006.01)
*G06K 9/66* (2006.01)
*G06K 9/62* (2006.01)

(52) U.S. Cl.
CPC ............... *G06K 9/66* (2013.01); *G06K 9/6267* (2013.01)

(58) Field of Classification Search
CPC .............................. G06K 9/6267; G06K 9/66
See application file for complete search history.

(56) References Cited

U.S. PATENT DOCUMENTS

| 6,278,464 | B1* | 8/2001 | Kohavi et al. ................. 345/440 |
| 2010/0173269 | A1* | 7/2010 | Puri et al. ....................... 434/127 |
| 2011/0182477 | A1* | 7/2011 | Tamrakar et al. ............. 382/110 |
| 2013/0088499 | A1* | 4/2013 | Sato et al. ...................... 345/501 |
| 2015/0132722 | A1* | 5/2015 | Menczel ............ G09B 19/0092 434/127 |
| 2015/0220592 | A1* | 8/2015 | Robberechts ..... G06F 17/30386 715/810 |

OTHER PUBLICATIONS

Gary M. Weiss, Foster Provost, "Learning when training data are costly: the effect of class distribution on tree induction", Journal of Artificial Intelligence Research, v.19 n. 1, p. 315-354, Jul. 2003.*
Foody, G.M., "Training pattern replication and weighted class allocation in artificial neural network Classification" Neural Computing and Applications, vol. 3, pp. 178-190, 1995.*
'CDTR' [online]. "Access with Technology Blog Meal Snap—Calorie Counting Magic," Feb. 21, 2013, [retrieved on Apr. 17, 2013]. Retrieved from the Internet: cdtr.unc.edu/index.php/cores/access-with-technology/access-with-technology-blog/85-meal-snap-calorie-counting-magic, 2 pages.
'iTunes Preview,' [online]. "Meal Snap—Calorie Counting Magic," 2013, [Retrieved on Apr. 15, 2013]. Retrieved from the Internet: http://itunes.apple.com/us/app/meal-snap-calorie-counting/id425203142?mt=8, 2 pages.
Amrich, "Can iPhone Meal Snap photo app magically tell what's in your meal? We put it to the test," ZDNet Health, Apr. 15, 2011, 10 pages.
Yang et al., "Food Recognition Using Statistics of Pairwise Local Features," CVPR, Jun. 2010, pp. 2249-2256.

* cited by examiner

*Primary Examiner* — Nirav G Patel
*Assistant Examiner* — Ian Lemieux
(74) *Attorney, Agent, or Firm* — Fish & Richardson P.C.

(57) ABSTRACT

Methods, systems, and apparatus, including computer programs encoded on computer storage media, for selecting training images. One of the methods includes determining, for each of a plurality of labels that each designate a respective food class of a plurality of food classes, a respective measure of importance. A respective sample size is determined for the label based on the respective measure of importance of the label. A number of training images are selected for each respective label according to the determined sample size for the label. A predictive model is trained using the selected training images as training data.

21 Claims, 4 Drawing Sheets

TRAINING IMAGE SAMPLING

BACKGROUND

This specification relates to image classification.

Some machine learning systems classify food items that are shown in images into certain classes. For example, food items shown in images can be classified by the name of the food item, such as "apple" or "potato." When obtaining training data to train a classifier for food items, available training data examples for each food item classification can range from fewer than a hundred examples to thousands or millions of examples.

SUMMARY

This specification describes systems and methods for training a model to classify food items shown in images. In general, the system can select training examples for each of a number of classes according to a measure of importance for each class. The system can then train a model using the selected training examples. The trained model can be used by a system that provides nutritional information or recipe search results, for example, in response to images of food.

A training system can automatically generate a training set for constructing a predictive model for food classification. The system can take into account the variability in the number of available images for each food class when generating the training sets. The system can present useful data in response to an image query by using the predictive model to classify food items in the image query into food classes.

In general, one innovative aspect of the subject matter described in this specification can be embodied in methods that include the actions of for each of a plurality of labels that each designate a respective food class of a plurality of food classes, wherein each food class represents a different food item: determining a respective measure of importance of the label of the plurality of labels, and determining a respective sample size for the label of the plurality of labels, wherein the sample size is based on the respective measure of importance of the label; selecting, from a collection of labeled images, for each respective label of the plurality of labels, a number of training images according to the determined sample size for the label; and training a predictive model using the selected training images as training data. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include determining that the collection of labeled images includes a number of images having a first label that is smaller than the sample size assigned to the first label; and selecting a number of training images for the first label based on the sample size for the first label, wherein at least one image having the first label is used multiple times as a training image for the first label. The actions include determining that the collection of labeled images includes a number of images having a second label that is larger than the sample size assigned to a corresponding second label; and selecting a number of training images for the second label based on the sample size for the second label, wherein each image in the number of training images for the second label is used no more than once as a training image for the second label. Training the model comprises selecting, for a subsequent training iteration, a same number of training images for a first label, wherein at least one image in the number of training images for the first label is used multiple times as a training image for the first label. The actions include assigning a same measure of importance to (i) a first label for a first food class having a first number of images in the collection of images, and (ii) a second label for a second food class having a smaller second number of images in the collection of images. At least one image having the second label is used multiple times as a training image for the second label. The actions include receiving an image query that specifies an image of a food item; determining a label for the food item using the trained model; generating a search query based on the determined label; providing the search query to a search engine; and providing a result from the search engine in response to the image query. The search engine is a general internet search engine, a nutritional information search engine, or a recipe search engine.

Particular embodiments of the subject matter described in this specification can be implemented so as to realize one or more of the following advantages. A food classification system trained in the manner described in this specification can recognize a great variety of foods with good specificity. This allows such a system to more accurately and precisely identify food items from image queries. Users can use such a system to more accurately monitor personal nutrition and to more easily locate recipe information.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
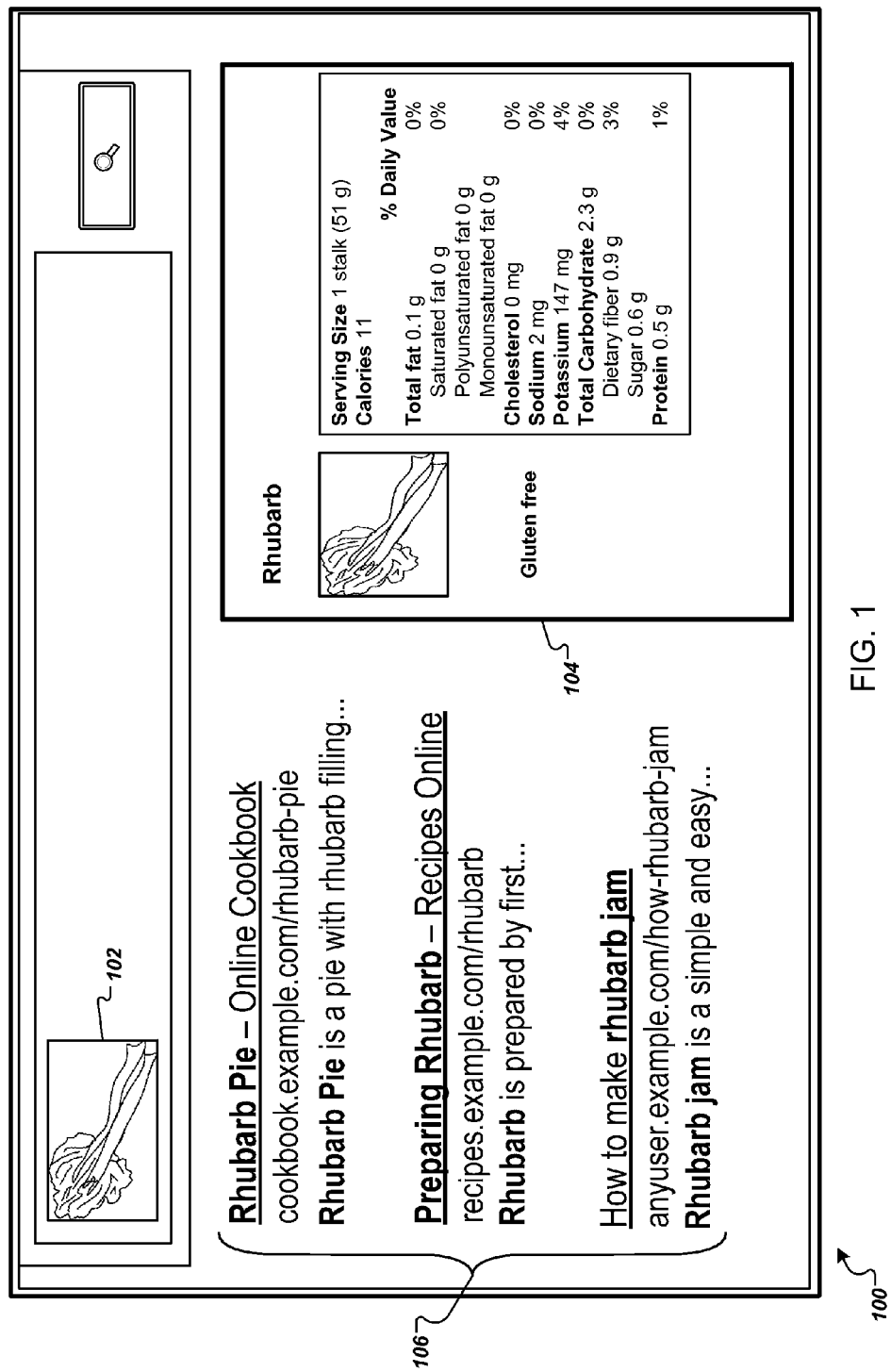
FIG. 1 illustrates an example search results page that includes a response from a food classification system.

FIG. 1 illustrates an example search results page 100 that includes a response from a food classification system. The example search results page 100 is an example presentation generated by a system that can classify food items shown in images.

The system can receive an image query 102 that specifies an image of one or more food items. For example, the image query 102 can be an uploaded image or a location of an image on a network, e.g., a Uniform Resource Locator. Food items in the specified image can be raw produce or ingredients, e.g., a rhubarb stalk, uncooked cabbage, or an apple. The food items can also be prepared food items, e.g., rhubarb pie, grilled steak, or crispy fried potatoes.

The system classifies one or more food items in the image and, in response, presents nutritional information 104, recipe search results 106, or both, for one or more food items classified from the image. A recipe search result identifies a resource that includes information for preparing a particular food item. The system can generate a recipe search results using an internal database of recipes or from external sources, e.g., resources on the Internet. Nutritional information provided for a food item can include information about any appropriate nutritional attribute for a food item, e.g., serving size, calories per serving, total fat, cholesterol content, sodium content, carbohydrate content, protein content, to name a few examples.

For example, if the system classifies the image as including a raw rhubarb stalk, the system can present nutritional information 104 for raw rhubarb or recipe search results 106 for preparing raw rhubarb. The system may also present nutritional information and recipe search results for one or more prepared food items that include rhubarb as an ingredient. If the system classifies the image as including a prepared food item, e.g., rhubarb pie, the system can present nutritional information for rhubarb pie or recipe search results for preparing rhubarb pie. The system may also present nutritional information for one or more individual food items, e.g., raw rhubarb or flour, included in an image of a prepared food item, e.g., an image of rhubarb pie.

The system can also or alternatively present general Internet search results in response to the image query 102. For example, the system can obtain Internet search results that are responsive to a text query generated from classification of a food item in the image specified by the image query 102.

Figure 2:
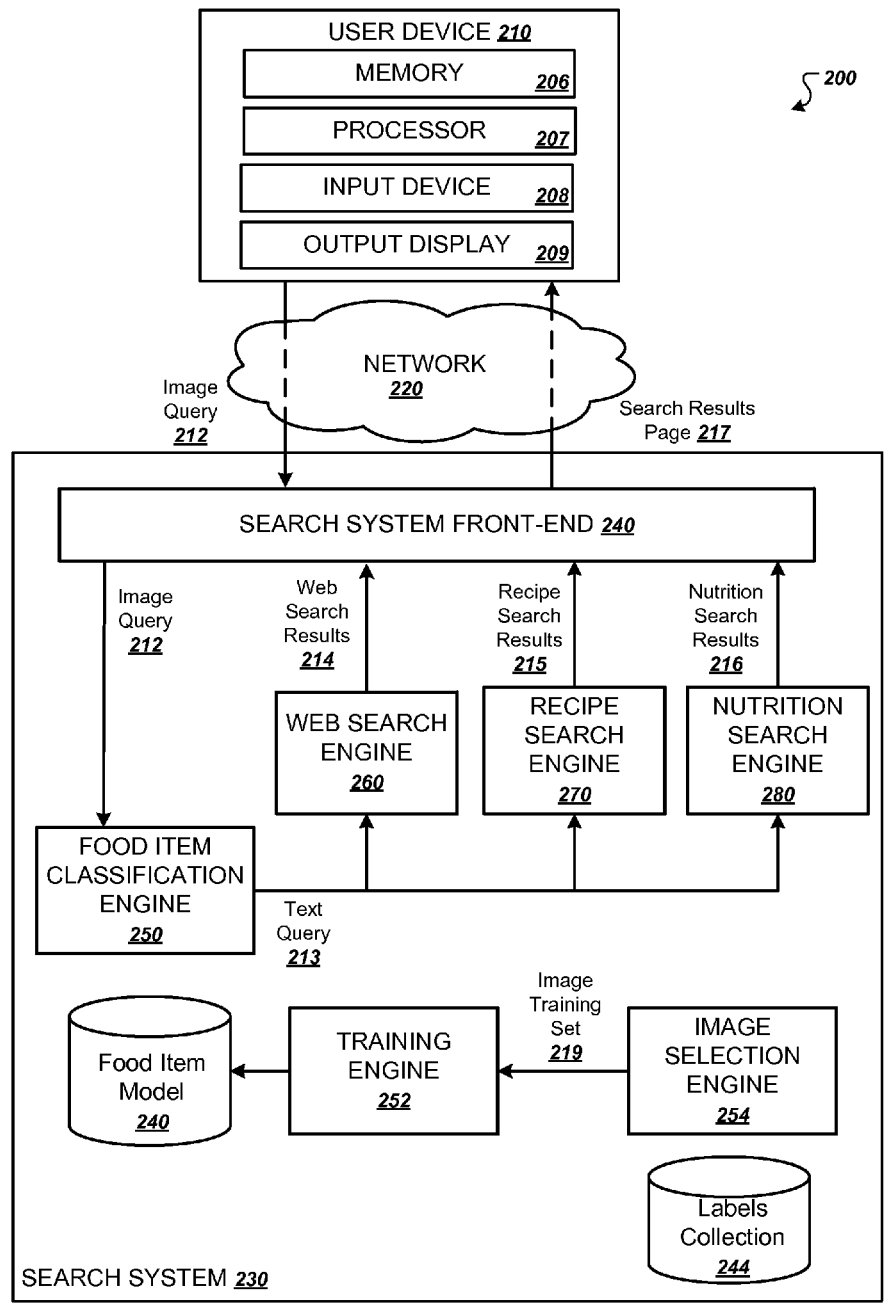
FIG. 2 is a block diagram of an example food classification system.

FIG. 2 illustrates an example food classification system 200. In general, the system 200 includes a user device 210 with a memory 206, a processor 207, an input device 208, and an output display 209 coupled to a search system 230 over a network 220. The example search system 230 includes a search system front end 240, a food item classification engine 250, a training engine 252, and an image selection engine 254. The example search system 230 also includes multiple search engines, a web search engine 260, a recipe search engine 270, and a nutrition search engine 280. The search system 230 is an example of an information retrieval system in which the systems, components, and techniques described below can be implemented. The search system 230 can be implemented as computer programs installed on one or more computers in one or more locations that are coupled to each other through a network.

In operation, the user device 210 transmits an image query 212 to the search system 230, e.g., over the network 220. In some implementations, a user can submit the image query 212 through a graphical user interface of a software application, e.g., a web page user interface provided by the system and rendered by a web browser. A user can also or alternatively submit the image query 212 through a camera application on the user device 210

The search system 230 generates a response, generally in the form of a search results page 217. For example, the search results page 217 can be provided as a markup language document, e.g., a HyperText Markup Language (HTML) document, and the user device 210 can render the document using a web browser in order to present the search results page 217 on an output display 209 of the user device 210. The search results page 217 is a presentation of web search results 214, recipe search results 215, nutrition search results 216, or some combination of these, that are responsive to a text query 213 generated from food items shown in the image specified by the image query. For example, the search results page 217 can include one or more descriptions of food items shown in the image.

In general, the search system front end 240 receives the image query 212 from the user device 210 and routes the query 212 to a food item classification engine 250. The search system front end 240 also provides the resulting search results page 217 that includes the various search results to the user device 210.

The food item classification engine 250 receives the image query 212 and generates a feature representation of features found in the image, e.g., a feature vector. The food item classification engine 250 can determine local features, e.g., features that are each computed from a particular subset of the image, or whole-image features, e.g., features that are computed from features of the entire image. The food item classification engine 250 can generate a numerical value that represents each determined feature. The food item classification engine 250 can then generate the feature representation using the generated numerical values.

The food item classification engine 250 uses the feature representation as input to a food item model 240 and receives as output one or more labels that each identify a class of a food item determined by the engine 250 to be shown in the image, according to the food item model 240. Each label is associated with a particular text string that describes the food class, e.g., "orange" or "grapefruit."

The food item classification engine 250 uses text associated with the one or more labels to generate a text query 213 or multiple text queries. The food item classification engine 250 then submits the text query 213 or queries to one or more search engines. For example, a web search engine 260 can provide web search results 214 that are responsive to the text query 213. A recipe search engine 280 can provide recipe search results 216 that identify recipes that include the one or more food items specified by the text query 213. A nutrition search engine 270 can provide nutrition search results 215 that include nutritional information about food items specified by the text query 213.

A training engine 252 trains the food item model 240 using an image training set 219 of labeled training images received from an image selection engine 254. The food item 240 model can be a deep neural network. A deep network is a machine learning model that is composed of multiple levels of non-linear operations, with each level having a respective set of parameters. That is, a deep network receives as an input floating point representations of image features and applies one or more non-linear transformations to the floating point representations in order to generate an alternative representation of the input. For example, a deep network may include one or more neural network layers that perform a respective nonlinear transformation on its input, a sparse binary output layer, or both.

The image selection engine 254 selects labeled images from a collection of labeled images to use as training data. The labeled images selected can include images for all of the labels appearing in the collection, or only images having one or more labels appearing in a predetermined collection of labels, e.g., labels collection 244. For each of the labels, the image selection engine 254 selects one or more images from the collection of labeled images, each image having a label matching the respective received label. The image selection engine 254 generates the image training set 219 from the selected images.

The image selection engine 254 selects images for the image training set 219 from a collection of images, for example, collection of images that is part of the search system 230. The image selection engine 254 can also select for the image training set 219 from a collection of images that is external to the search system 230, e.g., images on the Internet. For example, the image selection engine 254 can obtain images by crawling images located on web pages or by issuing a search query over the Internet to an image search engine.

For each label, the image selection engine 254 may select into the training set 219 images in the collection of labeled images having a label matching the received label. The training set 219 may contain only distinct images or the training set 219 may contain duplicates. The training set 219 is provided to the training engine 252, which trains the food item model 240 using an appropriate machine learning technique. The training engine 252 can then provide the food item model 240 to the food item classification engine 250 in the search system 230.

Figure 3:
FIG. 3 is a flow chart of an example process for training a food classification model.

FIG. 3 is a flow chart of an example process for training a food item model. In general, the system receives labels that designate food categories. The system can then determine the importance of each of these labels, determine sample sizes based on the importance, select images according to that sample size, and train a food item model using those selected images. The process 300 will be described as being performed by a system of one or more appropriately programmed computers, e.g., the search system 230 of FIG. 2.

The system receives a plurality of labels (310). The system can receive labels from a labels database, e.g., the labels database 272. Each label designates a respective food class. For example, the system may receive labels designating the food classes "banana," "potato," and "rhubarb." Food classes can describe raw foods such as "apple" and "celery," or they can describe prepared foods such as "apple pie" and "grilled steak." The food labels can also include labels that represent class and subclass relationships, e.g., "flour" and "wheat flour."

After receiving the labels, the system determines a measure of importance for each label (320). For example, the system can determine that the importance of each label is directly proportional or inversely proportional to a measure of popularity for the food item that the label represents. In some implementations, the importance of a label can be related to the number of images having that label in a collection of images. That is, the importance of a label can be based on the number of times images having that label occur in the collection of images. For example, the system can assign a higher importance to labels associated with a larger number of images in the collection of images than to labels associated with a smaller number of images.

In some implementations, the system applies a boost to the measure of importance for labels having small measures of importance. For example, if a label for a particularly rare or under-represented food item has only a very small number of representative images, the system can boost the importance assigned to the label, e.g. by adding a particular boost factor to the measure of importance or multiplying the measure of importance by a particular boost factor. Boosting the measure of importance of the label can signify that the system considers that particular label to have greater importance than what might be indicated by the number of representative images. In some implementations, the system applies a squashing function to the measures of importance, such that no label's measure of importance falls below a certain minimum level or above a certain maximum level. Boosting the measure of importance or applying a squashing function to the measures of importance has the effect of preventing any particular food item classification from being under represented.

The system can assign an equal measure of importance to each label. In other words, the measure of importance can be independent of the number of representative images for the label, and a label having only a small number of representative images would have a same measure of importance as a label having a very large number of representative images.

The system can generate a distribution of measures of importance for the labels using other sources of data, e.g., search query traffic. In other words, the system can determine a distribution of measures of importance for labels according to a frequency with which the text associated with the label occurs in search queries. The system may also modify the distribution by applying a boost to measures of importance for labels having a frequency that satisfies a threshold.

The system determines a sample size for each label (330). The system can determine the sample size for a label based on the assigned measure of importance for the label from the distribution of measures of importance. For example, the system can determine a sample size for a label that is proportional to the assigned measure of importance for the label in the distribution. The system can determine a distribution of sample sizes for each respective label that is roughly similar to the relative distribution of the measures of importance assigned to those labels.

The system can also use a number of predetermined sample sizes, e.g., 50, 100, and 150, and determine to which of the predetermined sample sizes the label belongs, based on the relative measure of importance of the label in the distribution. For example, labels having the smallest measures of importance in the distribution can be assigned to a smallest sample size and labels having the largest measures of importance in the distribution can be assigned to a largest sample size.

The system selects training images for each label from a collection of images (340). In general, the system randomly or pseudo-randomly selects a number of images having a particular label from the collection of images until a number of images corresponding to the determined sample size have been selected. The random or pseudo-random selection can be performed with or without replacement. That is, once an image is selected, the system can randomly or pseudo-randomly select the same image again, or the system can randomly or pseudo-randomly select each image at most once.

Because the sample size for a label is based on the measure of importance assigned to the label, the system may select, for two labels having different numbers of images having the respective label, a same number of training images. If the collection of images includes fewer images having a particular label than the sample size determined for that label, the system selects multiple instances of a particular image to reach the determined sample size. For example, the system may select 100 samples from 5 images by selecting each image 20 times. In some implementations, the selection is not necessarily uniform, and not all images having the label are necessarily selected at all. For example, the system may select 100 samples from 5 images by selecting a first image 90 times and a second image 10 times.

In some implementations, if the collection of images includes more images of a particular label than the sample size determined for the label, the system selects images having the label such that no image is selected more than once.

The system trains a food item model from the selected images (350). The training process may be repeated multiple times to yield a better food item model. The images selected into the training set for each food class can be different on each iteration. Alternatively, the images selected into the training set for one or more food classes can be the same as the images selected into the training set during the previous iteration.

Specifically, for a given label, the system can reselect images having that label into the training set for another iteration where the number of images in the collection of images having that label exceeds the determined sample size for that label. The reselection process for each iteration can be performed by the same random or pseudo-random selection process described in this specification above, or it can be performed by any other appropriate algorithm. For labels whose determined sample size is greater than the number of available examples in the collection of images, the system needs not, but can, perform a random, pseudo-random, or other appropriate selection process to reselect images having that label into the training set. The system can select the same set of images having that label into the training set as were selected in the previous iteration.

Figure 4:
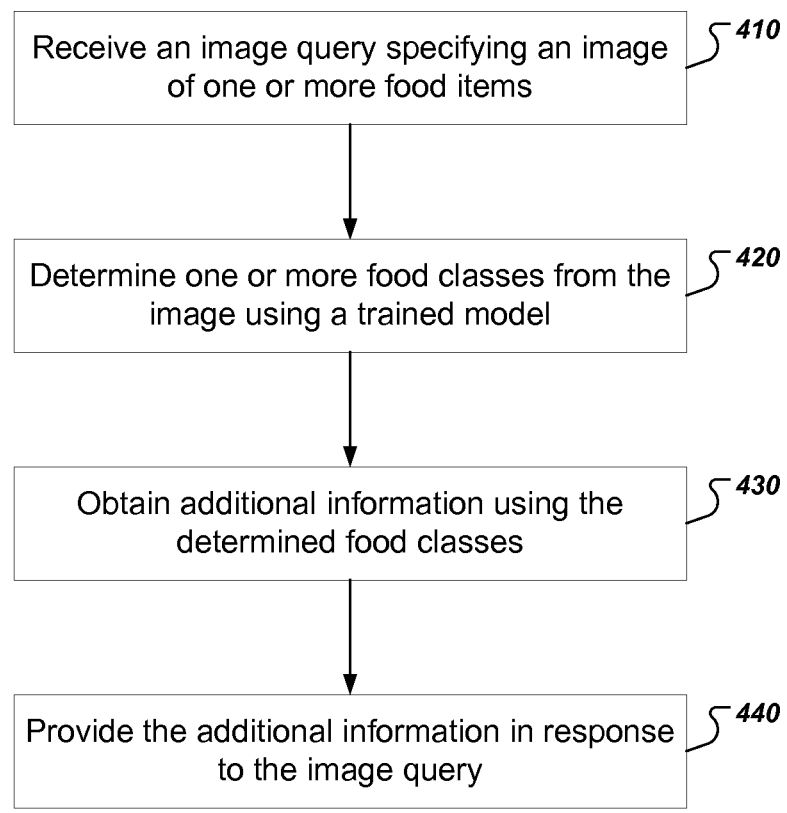
FIG. 4 is a flow chart of an example process for providing additional information for a determined food class for an image query.

FIG. 4 is a flow chart of an example process for providing additional information for a determined food class for an image query. In general, the system receives an image query that specifies an image containing one or more food items. The system can use a trained model to determine one or more food classes of food items in the image. The system can then obtain additional information, e.g., nutritional information, recipe search results, or both, using the determined food classes and can provide the additional information to a user in response to the image query. The process 400 will be described as being performed by a system of one or more appropriately programmed computers, e.g., the search system of FIG. 2.

The system receives an image query specifying an image of one or more food items (410). For example, the system may receive an image query over a network from a camera on a user's mobile device, such as a mobile phone, a tablet, or a laptop computer.

The system determines one or more food classes for the received image query using a trained model (420). For example, the system can use the model to classify an image as including potatoes. The system can use the image specified by the image query as input to the trained model, and the trained model can generate one or more text labels as output, e.g., "apple" or "potato."

The system obtains additional information related to the determined food class or classes (430). The system can use the text label from the output of the model to obtain nutritional information, recipe search results, or both that relate to the food item identified by the text label. The system can generate a search query based on the text label of the determined food class for use in any appropriate search engine. The search query generated can be tailored to the specific search engine that the system is configured to use. For example, after classifying an image query as including "hamburger," the system may generate a search query that includes the terms "hamburger nutritional information." The system may then obtain search results responsive to the search query from a general Internet search engine.

The system can use the text label to obtain nutritional information from an internal database or from an external source, which may be a specialized public or proprietary search engine, e.g., the United States Department of Agriculture National Nutrient Database for Standard Reference. The system can obtain a number of calories or grams of fat associated with the food class, ingredients, amount of vitamins, grams of trans fats per unit weight or unit volume, or suggested serving size in weight or volume, whether the food is gluten free, vegan, carbohydrate free, or any combination of such properties to name just a few examples. The system can then present the obtained nutritional information to the user in response to the image query.

The system can also use the text label to obtain recipe search results. The system can obtain recipe search results from an internal database or another source. For example, in response to classifying an image query as "rhubarb pie," the system may generate a search query that includes the terms "rhubarb pie recipes" and can obtain search results responsive to the search query from a general Internet search engine. The system can also or alternatively generate a query that includes the terms "rhubarb pie" and obtain search results from a specialized public or proprietary recipe search engine.

Obtained recipe search results can include information about methods for preparing food items classified from the image query. For example, in response to classifying an image query as "rhubarb pie," the system can respond with one or more recipes for making rhubarb pie. These recipes can be obtained through one or more search queries as described above. Recipe search results can also or alternatively include methods by which one or more food items classified from the image query can be used to prepare other foods. For example, in response to classifying an image query as "potato," the system can respond with one or more recipes for making potato chips or French fries. These recipes can similarly be obtained through one or more search queries as described above.

The additional information retrieved is not necessarily limited to or required to include nutritional information or recipe search results. For example, the system can generate a search query based on the text label and can obtain general search results from an Internet search engine based on the search query.

The system provides the additional information in response to the image query (440). For example, the system can combine obtained nutritional information, recipe search results, and general search results in any appropriate format and provide a search results page for presentation to a user.

Although the examples above relate to classifying food items, the techniques described are not limited to classifying food items. A system can train a model using the methods described in this specification to classify any number of appropriate items for classification. For example, a system can train a model to classify automobiles, e.g., by year, make, and model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of classifying an image into a food class comprising:
    for each of a plurality of labels that each designate a respective food class of a plurality of food classes, wherein each food class represents a different food item:
        determining a respective measure of importance of the label of the plurality of labels, and
        determining a respective sample size for the label of the plurality of labels, wherein the sample size is based on the respective measure of importance of the label;
    determining, for each label of a subset of labels having smallest respective measures of importance, that a collection of labeled images includes fewer images having the label than a respective determined sample size for the label;
    selecting, from the collection of labeled images, for each respective label of the plurality of labels, a number of training images according to the determined sample size for the label, including selecting, for each label of the subset of labels having the smallest respective measures of importance, multiple instances of at least one image having the label; and
    training a predictive model using the selected training images as training data.

2. The method of claim 1, further comprising:
    boosting a measure of importance for a first label of the subset of labels having the smallest respective measures of importance;
    determining an updated sample size based on the boosted measure of importance for the first label; and
    selecting a number of training images for the first label based on the updated sample size for the first label, wherein at least one image having the first label is selected multiple times as a training image for the first label.

3. The method of claim 2, further comprising:
    determining that the collection of labeled images includes a number of images having a second label that is larger than the sample size assigned to a corresponding second label; and
    selecting a number of training images for the second label based on the sample size for the second label, wherein each image in the number of training images for the second label is used no more than once as a training image for the second label.

4. The method of claim 1, wherein training the predictive model comprises:
    selecting, for a subsequent training iteration, a same number of training images for a first label, wherein at least one image in the number of training images for the first label is used multiple times as a training image for the first label.

5. The method of claim 1, further comprising:
    assigning a same measure of importance to (i) a first label for a first food class having a first number of images in the collection of images, and (ii) a second label for a second food class having a smaller second number of images in the collection of images.

6. The method of claim 5, wherein at least one image having the second label is used multiple times as a training image for the second label.

7. The method of claim 1, further comprising:
    receiving an image query that specifies an image of a food item;
    determining a label for the food item using the trained model;
    generating a search query based on the determined label;
    providing the search query to a search engine; and
    providing a result from the search engine in response to the image query.

8. The method of claim 7, wherein the search engine is a general Internet search engine, a nutritional information search engine, or a recipe search engine.

9. A system comprising:
    one or more computers and one or more storage devices storing instructions that are operable, when executed by the one or more computers, to cause the one or more computers to perform operations comprising:
        for each of a plurality of labels that each designate a respective food class of a plurality of food classes, wherein each food class represents a different food item:
            determining a respective measure of importance of the label of the plurality of labels, and
            determining a respective sample size for the label of the plurality of labels, wherein the sample size is based on the respective measure of importance of the label;
        determining, for each label of a subset of labels having smallest respective measures of importance, that a collection of labeled images includes fewer images having the label than a respective determined sample size for the label;
        selecting, from the collection of labeled images, for each respective label of the plurality of labels, a number of training images according to the determined sample size for the label including selecting, for each label of the subset of labels having the smallest respective measures of importance, multiple instances of at least one image having the label; and
        training a predictive model using the selected training images as training data.

10. The system of claim 9, wherein the operations further comprise:
    boosting a measure of importance for a first label of the subset of labels having the smallest respective measures of importance;
    determining an updated sample size based on the boosted measure of importance for the first label; and
    selecting a number of training images for the first label based on the updated sample size for the first label, wherein at least one image having the first label is selected multiple times as a training image for the first label.

11. The system of claim 10, wherein the operations further comprise:
determining that the collection of labeled images includes a number of images having a second label that is larger than the sample size assigned to a corresponding second label; and
selecting a number of training images for the second label based on the sample size for the second label, wherein each image in the number of training images for the second label is used no more than once as a training image for the second label.

12. The system of claim 9, wherein training the predictive model comprises:
selecting, for a subsequent training iteration, a same number of training images for a first label, wherein at least one image in the number of training images for the first label is used multiple times as a training image for the first label.

13. The system of claim 9, wherein the operations further comprise:
assigning a same measure of importance to (i) a first label for a first food class having a first number of images in the collection of images, and (ii) a second label for a second food class having a smaller second number of images in the collection of images.

14. The system of claim 13, wherein at least one image having the second label is used multiple times as a training image for the second label.

15. The system of claim 9, wherein the operations further comprise:
receiving an image query that specifies an image of a food item;
determining a label for the food item using the trained model;
generating a search query based on the determined label;
providing the search query to a search engine; and
providing a result from the search engine in response to the image query.

16. The system of claim 15, wherein the search engine is a general Internet search engine, a nutritional information search engine, or a recipe search engine.

17. A computer program product, encoded on one or more non-transitory computer storage media, comprising instructions that when executed by one or more computers cause the one or more computers to perform operations comprising:
for each of a plurality of labels that each designate a respective food class of a plurality of food classes, wherein each food class represents a different food item:
determining a respective measure of importance of the label of the plurality of labels, and
determining a respective sample size for the label of the plurality of labels, wherein the sample size is based on the respective measure of importance of the label;
determining, for each label of a subset of labels having smallest respective measures of importance, that a collection of labeled images includes fewer images having the label than a respective determined sample size for the label;
selecting, from the collection of labeled images, for each respective label of the plurality of labels, a number of training images according to the determined sample size for the label, including selecting, for each label of the subset of labels having the smallest respective measures of importance, multiple instances of at least one image having the label; and
training a predictive model using the selected training images as training data.

18. The computer program product of claim 17, wherein the operations further comprise:
boosting a measure of importance for a first label of the subset of labels having the smallest respective measures of importance;
determining an updated sample size based on the boosted measure of importance for the first label; and
selecting a number of training images for the first label based on the updated sample size for the first label, wherein at least one image having the first label is selected multiple times as a training image for the first label.

19. The computer program product of claim 17, wherein training the predictive model comprises:
selecting, for a subsequent training iteration, a same number of training images for a first label, wherein at least one image in the number of training images for the first label is used multiple times as a training image for the first label.

20. The computer program product of claim 17, wherein the operations further comprise:
assigning a same measure of importance to (i) a first label for a first food class having a first number of images in the collection of images, and (ii) a second label for a second food class having a smaller second number of images in the collection of images.

21. The computer program product of claim 20, wherein at least one image having the second label is used multiple times as a training image for the second label.

* * * * *